United States Patent [19]

Sugiura et al.

[11] Patent Number: 5,448,267
[45] Date of Patent: Sep. 5, 1995

[54] LASER BEAM PRINTER HAVING ROTATIONAL CONTROL OF IMAGE BEARING MEMBER AND DEFLECTING DEVICE

[75] Inventors: Yoshinori Sugiura, Kawasaki; Akihiko Takeuchi, Yokohama, both of Japan

[73] Assignee: Canon Kabushiki Kaisha, Tokyo, Japan

[21] Appl. No.: 337,232

[22] Filed: Nov. 4, 1994

Related U.S. Application Data

[63] Continuation of Ser. No. 593,649, Oct. 4, 1990, abandoned.

[30] Foreign Application Priority Data

Oct. 14, 1989 [JP] Japan ................. 1-267514

[51] Int. Cl.6 ............................................. G01D 9/42
[52] U.S. Cl. ........................................ 347/260; 347/250
[58] Field of Search ................. 346/108, 160, 76 L; 358/296, 300; 355/211

[56] References Cited

U.S. PATENT DOCUMENTS

| | | | |
|---|---|---|---|
| 4,647,946 | 3/1987 | Inuyama | 346/108 |
| 4,809,025 | 2/1989 | Noguchi | 346/154 |
| 4,894,669 | 1/1990 | Sugiura | 346/160 |
| 4,922,272 | 5/1990 | Wakamatsu et al. | 346/160 |
| 5,043,744 | 8/1991 | Fantuzzo | 346/108 |
| 5,107,279 | 4/1992 | Yamamoto et al. | 346/108 |
| 5,144,339 | 9/1992 | Ohashi et al. | 346/108 |

FOREIGN PATENT DOCUMENTS

| | | |
|---|---|---|
| 0139163 | 8/1983 | Japan . |
| 0119560 | 5/1987 | Japan . |
| 0050078 | 2/1989 | Japan . |

*Primary Examiner*—Robert Beatty
*Attorney, Agent, or Firm*—Fitzpatrick, Cella, Harper & Scinto

[57] ABSTRACT

A laser beam printer which includes a laser beam emitting device for emitting a laser beam which has been modulated in accordance with image information; a rotatable deflecting device for rotatably deflecting the laser beam emitted from the beam emitting device; a rotatable photosensitive member which is scanningly exposed to light by the laser beam deflected by the deflecting device; and a control device for controlling the rotation of the deflecting device and that of the photosensitive member. The control device starts the rotation of the deflecting device after starting the rotation of the photosensitive member, so that the deflecting device reaches a predetermined rotational speed simultaneously with completion of pre-rotation of the photosensitive member.

29 Claims, 6 Drawing Sheets

LASER BEAM PRINTER HAVING ROTATIONAL CONTROL OF IMAGE BEARING MEMBER AND DEFLECTING DEVICE

This application is a continuation of application Ser. No. 07/593,649 filed Oct. 4, 1990, now abandoned.

BACKGROUND OF THE INVENTION

1. Field of the Invention

The present invention relates to a laser beam printer having a rotatable photosensitive member and rotatable deflection means capable of deflecting a laser beam toward the photosensitive member.

2. Description of the Related Art

Recently, optical beam printers have been widely used each of which is capable of forming a desired image by scanning a photosensitive member by an optical beam such as a laser beam which has been modulated by an image signal.

In a laser beam type printer of the optical beam printers, the laser beam is ordinarily deflected by rotating a rotational mirror such as a rotational polygonal mirror and a Galvano mirror or a hologram.

A laser beam printer of the type describe above is arranged in such a manner that the rotation of a photosensitive member is started simultaneously with the rotation start of a deflector. While waiting for the deflector to reach a predetermined rotational speed, pre-operational processing for the photosensitive member is performed. When the rotation of the deflector reaches a predetermined speed, the pre-operational processing is stopped and image forming commences.

The pre-operational processing will be described.

The sensitivity of a photosensitive member changes depending upon the duration of time between image forming operations.

Therefore, during pre-operational processing the photosensitive member is rotated prior to image forming, and, for the purpose of stabilizing the sensitivity of the photosensitive member, the exposure lamp and the primary charger are operated.

The rotation of the photosensitive member during pre-operational processing (hereinafter "pre-rotation") is performed in such a manner that the photosensitive member is rotated by one or more revolutions so that the sensitivity is stabilized over the entire surface of the photosensitive member.

Typically, the resolution, that is, the dot density realized by a laser beam is 300 DPI, the printing speed is 8 paper sheets per minute, the revolution speed of a rotational polygonal mirror having 6 planes at the time of the light deflection operation is about 5566 rpm, the diameter of the photosensitive member is 15 mm and the processing speed (the movement speed on the surface of the photosensitive member) is 15 $\pi$mm ($\pi = 3.14159$). The time taken to make the driving motor for the rotational polygonal mirror rotate stably at 5566 rpm is 3 to 4 seconds. Furthermore, its sequence is arranged in such a manner that the rotation of the driving motor is started simultaneously with the start of the photosensitive drum in response to the turning on of the print signal. In consideration of the life of the photosensitive member, pre-rotation is arranged to be performed by two revolutions, that is two seconds. Therefore, by the time the rotation of the polygonal-mirror rotating motor reaches the predetermined speed, pre-rotation of the photosensitive drum has been completed. As a result, constant speed rotation can be realized and image forming can begin.

Recently, a scanning optical device employing a small-diameter polygonal mirror has been developed so as to meet the desire to reduce the size of the apparatus. Therefore, the diameter of the rotor of the polygonal-mirror rotating motor was also reduced, causing the inertia moment of the rotating portions to be smaller. As a result, the time taken to reach constant rotating speed is one second or shorter. Therefore, the above-described pre-rotation sequence cannot be completed by the time the mirror reaches its predetermined speed, and image quality decreases.

Pre-rotation must, usually, be performed by two revolutions or more. Therefore, if the above-described pre-rotation cannot be performed, pre-operational processing cannot be performed sufficiently, causing the sensitivity of the photosensitive member to become non-uniform.

Although a structure has been disclosed in order to overcome the above-described problem, the structure capable of controlling the starting time must be provided with a complicated control circuit, causing the overall cost to be raised excessively. It has been considered to employ another structure arranged in such a manner that the rotation of the polygonal-mirror rotating motor is continued until the completion of the pre-rotation. However, the useless rotation of the polygonal-mirror rotating motor may use energy wastefully, and what is even worse, the life of the polygonal-mirror rotating motor is undesirably shortened. In addition, an excessively large electric current passes if the polygonal-mirror rotating motor and the drum driving motor are simultaneously started. Therefore, a problem arises in that a large power source must be provided.

SUMMARY OF THE INVENTION

An object of the present invention is to provide a laser beam printer arranged in such a manner that the rotation of a deflection means is started after the rotation of a photosensitive member has been started.

Another object of the present invention is to provide a laser beam printer capable of performing pre-operational processing for the photosensitive member without useless rotation of the deflection means.

A further object of the present invention is to provide a laser beam printer capable of performing the rotation of the photosensitive member and that of the deflection means can be performed without waste regardless of the resolution of the image to be formed.

In one aspect of the invention, there is provided a laser beam printer comprising laser beam emitting means for emitting a laser beam which has been modulated in accordance with image information, rotatable deflecting means for rotatably deflecting the laser beam emitted from said laser beam emitting means, a rotatable photosensitive member which is scanningly exposed to light by the laser beam deflected by said deflecting means, said control means for controlling the rotation of said deflecting means and that of said photosensitive member, wherein said control means starts the rotation of said deflecting means after starting the rotation of said photosensitive member. The precise moment when the control means starts the rotation of the deflecting means may be controlled in accordance with the amount by which the photosensitive member has rotated, in accordance with a predetermined lapse of time from the start of rotation of the photosensitive member, or in accordance with when the photosensitive member reaches a predetermined speed.

Other and further objects, features and advantages of the invention will be appear more fully from the following description.

DESCRIPTION OF THE PREFERRED EMBODIMENTS

Preferred embodiments will be described with reference to the drawings.

Figure 1:
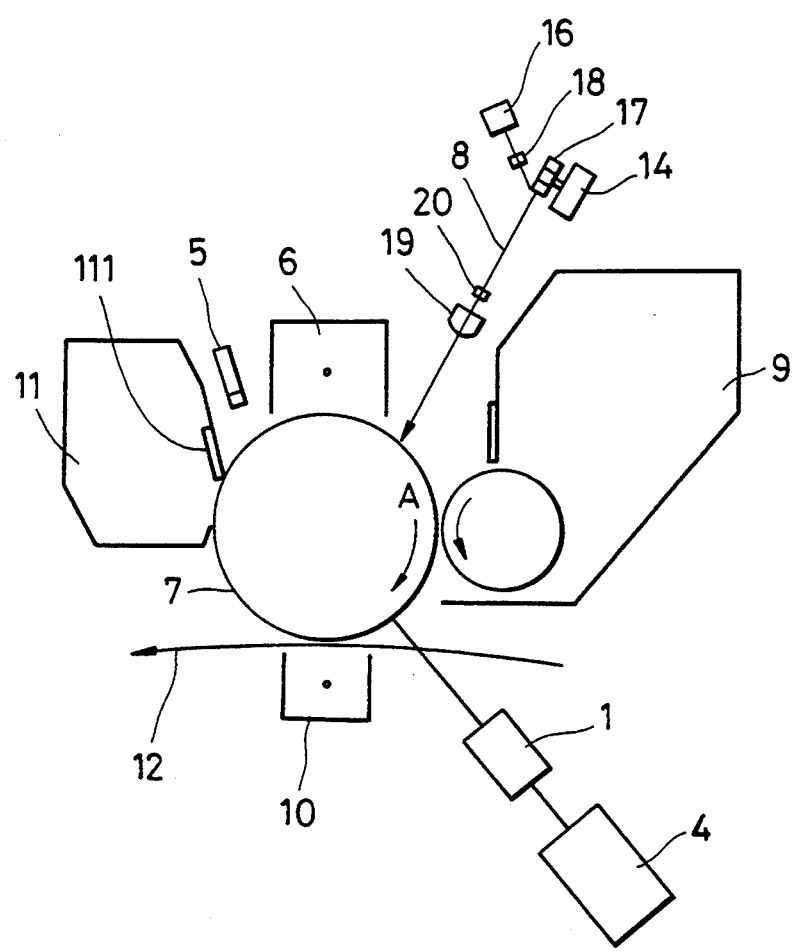
FIG. 1 is a schematic structural view which illustrates an embodiment of a laser beam printer according to the present invention.

FIG. 1 is schematic structural view which illustrates a laser beam printer to which the present invention is applied. Referring to the drawing, reference numeral 7 represents a photosensitive drum having an OPC photosensitive layer which is an organic photosensitive material, the photosensitive drum 7 being arranged to perform an endless motion. The photosensitive drum 7 is rotated by a drum rotating motor 4 in a direction designated by an arrow A.

An encoder 1 is fastened to the photosensitive drum 7 so that the quantity of the movement of the photosensitive drum 7 can be detected. The photosensitive drum 7 is subjected to a uniform negative charge by a primary charger 6 before it is exposed to light by a laser beam 8 so that a static latent image is formed.

The laser beam 8 is emitted from a laser unit 16 through collimator lens 18 and toward deflection means, in this case polygonal mirror 17. The laser beam 8 has been modulated in response to an electric signal denoting image information. Then, the thus modulated laser beam 8 is deflected by the rotary polygonal mirror 17 so as to scan the photosensitive drum 7. The rotary polygonal mirror 17 serving as the deflection mirror is operated by a polygon motor 14. Reference numerals 18, 19 and 20 respectively represent lens groups for an inclination correction imaging system for the rotary polygonal mirror 17.

The latent image formed on the surface of the photosensitive drum 7 is reversely developed by a developing device 9. The thus developed image is transferred to a recording material 12 by a transfer charger 10.

The photosensitive drum 7, from which the image has been transferred to the recording material 12, is cleaned by a cleaning device 11 having a rubber blade 111 which is arranged to come in contact with the surface of the photosensitive drum 7 so that the residual developer is removed. Then, the residual charge on the photosensitive drum 7 is removed by a pre-exposing lamp 5 so as to permit the repeated use of the photosensitive drum 7.

Figure 2:
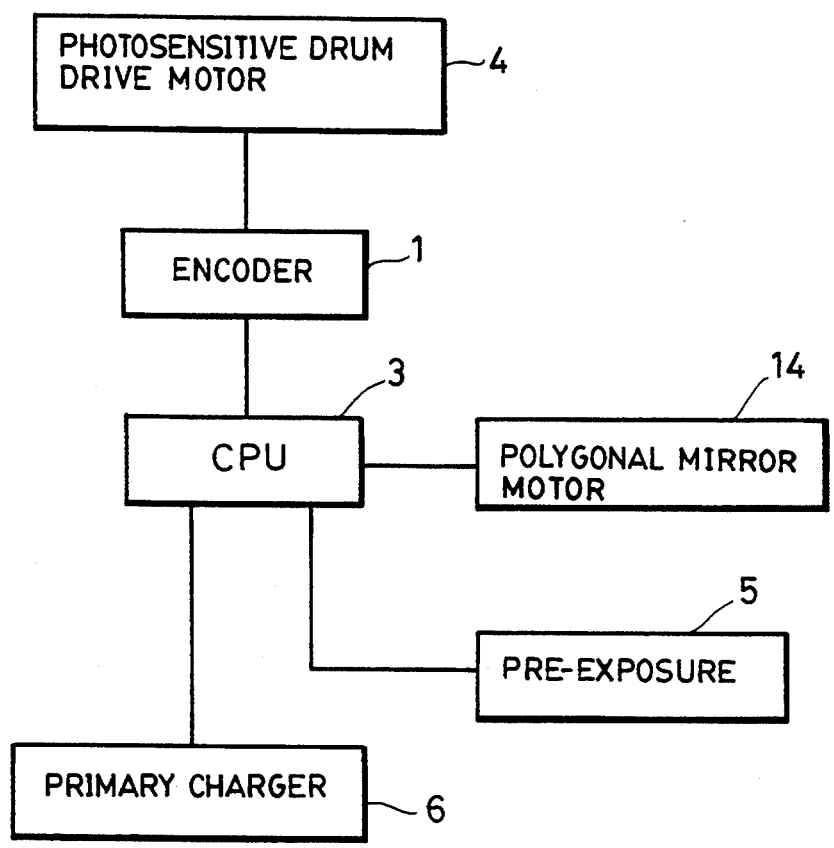
FIG. 2 is a block diagram of the FIG. 1 embodiment of the present invention.

FIG. 2 is a block diagram which further specifically illustrates the characteristics of this embodiment of the present invention.

As the pre-operational processing, the photosensitive drum 7 is operated by the drum rotating motor 4 so that a pulse signal is generated by encoder 1 which is directly connected to the drum rotating motor 4. CPU 3, which observes the output signal from the encoder 1, counts the number of the pulses so as to issue a command to rotate the polygonal motor 14.

The pre-operational processing is conducted in such a manner that the drum rotating motor 4 starts rotation so as to rotate the photosensitive drum 7. Simultaneously with the above-described rotation, the pre-exposure lamp 5 lights up. Then, a primary charger 6 is operated after a time delay of $t_1$ second which is the delay for the photosensitive drum 7 to start so that the rotation of the photosensitive drum 7 is stabilized. The transfer charger 10 is operated $t_2$ seconds later when the portion of the photosensitive drum 7 that corresponds to the portion first acted on by primary charger 6 confronts the transfer charger 10. The pre-rotation process is completed from the operation start of the primary charger 6 to the completion of two revolutions of the photosensitive drum 7 ($t_3$ second after). Then, an image forming process is started.

The organic photosensitive material has a characteristic that a charge history of its positive charge, which is the inverse polarity to the primary charge, may easily remain. The residual charge history cannot be easily removed even if light is applied thereto. Therefore, it is preferable that the positive transfer charged region be subjected to the primary charge. During this pre-operational processing rotation of the polygonal-mirror rotating motor 14 is started. In particular, rotation is started immediately before the completion of the pre-rotation process, the rotation start of the polygonal-mirror rotating motor 14 being determined by estimating the time to take for the polygonal-mirror rotating motor 14 to start its rotation.

Figure 3:
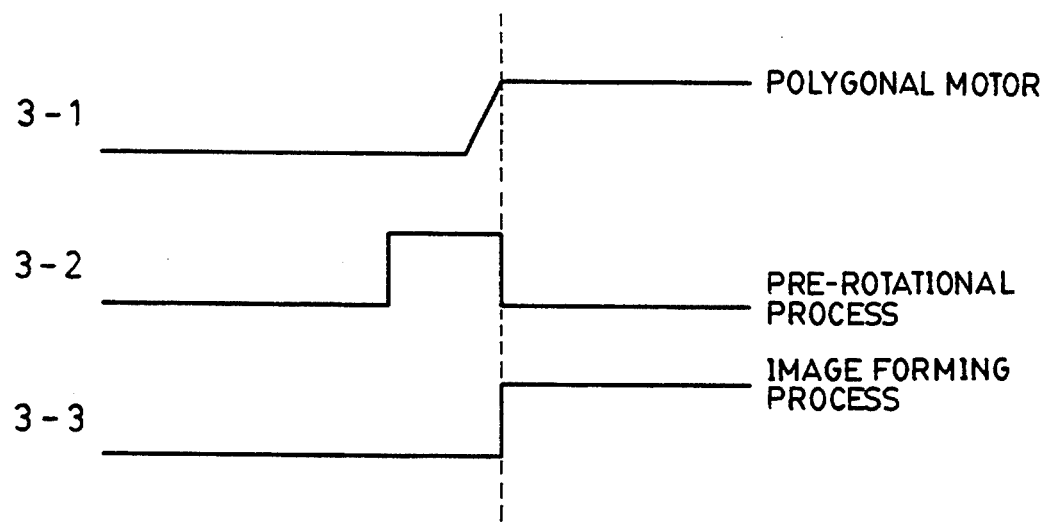
FIGS. 3 and 4 are timing charts which respectively illustrate the embodiment of the present invention.

FIG. 3 is a timing chart which illustrates a case in which the processing speed is 30 $\pi$mm/second and the diameter of the photosensitive drum 7 is 30 mm, where the photosensitive drum 7 rotates at once per second.

FIG. 3-1 illustrates the first transition characteristics of the motor for rotating the rotational polygonal mirror. Taken from a full stop, about 1.1 seconds is required for the mirror to reach servo lock at which the rotation is stabilized at a predetermined speed of 11132 rpm.

FIG. 3-2 illustrates the timing of the pre-rotation. As can be clearly seen from the diagram, the pre-rotation is ended simultaneously with the servo lock of the polygonal mirror. Although the servo locking timing at which the polygonal-mirror rotating motor reaches the predetermined revolution speed may, of course, be arranged to occur during the pre-rotation, useless rotations of the polygonal-mirror rotating motor can be prevented by arranging the timing as shown in FIG. 3. FIG. 3—3 illustrates the starting timing of the image forming process.

Figure 4:
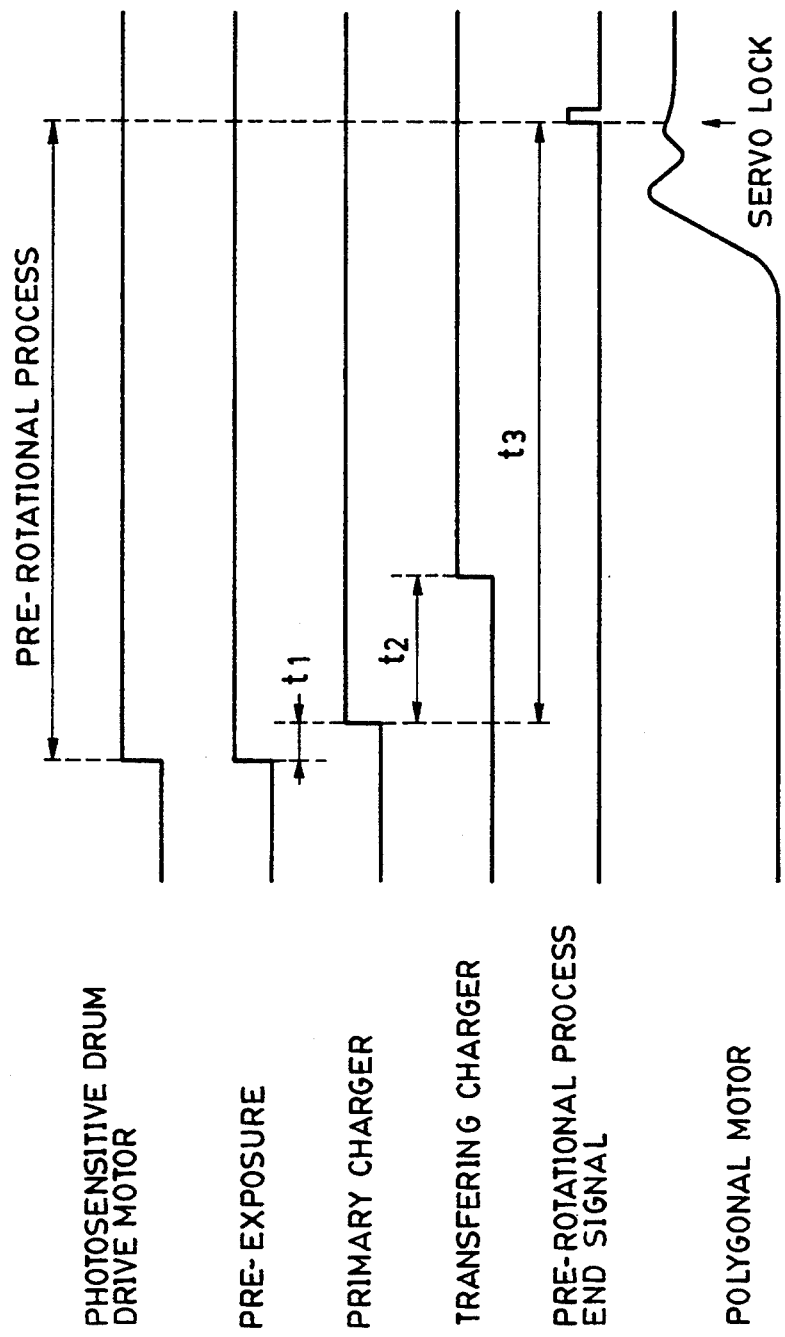

FIG. 4 is a timing chart for the above-described previous rotation.

The time taken for the polygonal-mirror rotating motor to start its rotation varies depending upon the power of the motor and the inertia moment. Deviation from this time can be reduced and an excellent reproductionality can be obtained if the conditions for the motor are determined. For example, in a case where a rotational speed of the rotational polygonal mirror is set based on which one of a plurality of dot densities is selected for the same basic apparatus, or in the case of a printer whose dot density can be changed, the acceleration of the motor cannot be changed unless the starting current is also changed. Specifically, the rotational speed is set to 8904 rpm, 11132 rpm and 14842 rpm when the dot density is switched to 240 DPI, 300 DPI and 400 DPI, respectively. As indicated above, it is necessary to perform servo locking for the motor within two seconds during the two revolutions of the photosensitive drum. Therefore, since the time for the motor to reach the predetermined speed varies in accordance with the selected dot density, it is necessary for the time taken from the start of the pre-rotation of the photosensitive drum to the start of the rotation of the polygonal-mirror rotating motor also to be selected in accordance with the selected dot density. For the above noted set of rotational speeds and dot densities, the motor should be switched on at a count of encoder pulses which corresponds to 1.11 seconds after the start of pre-rotation in the case of 240 DPI, 0.89 seconds in the case of 300 DPI and 0.52 seconds in the case of 400 DPI. As described above, since the rotation of the polygonal-mirror rotating motor is started after the rotation of the photosensitive drum has been started, the excessive rotation of the polygonal-mirror rotating motor can be prevented while the pre-rotation of the drum is sufficiently performed.

Furthermore, since the starting timing for the photosensitive drum and that for the polygonal-mirror rotating motor are different from each other, the necessity of passing a large level current at the same time can be eliminated. Therefore, the size of the power source can be reduced.

Since the time taken from the rotation start of the polygonal-mirror rotating motor to the servo locking after the rotational polygonal mirror reaches a predetermined rotational speed at the time of the optical deflection differs by a small degree depending upon the type of the apparatus, it is preferable for the pre-rotation process for the photosensitive member be completed within the above-described time period. Although, the pre-rotation is arranged to be performed two times, it may be arranged freely if it exceeds one rotation.

When the recording of the image signal has been completed, the power supply to the polygonal-mirror rotating motor has been switched off and the image transfer has been ended, the operation of the transfer charger 10 is stopped. Then, the post-rotation process is stopped after substantially the same processes as that for the previous rotation process have been performed. The photosensitive drum continues its rotation until the paper is discharged completely. Since the motor for rotating the rotational polygonal mirror takes 30 seconds to 40 seconds to stop its rotation after the power supply thereto has been stopped, the motor for rotating the rotational polygonal mirror continues its rotation even if the photosensitive drum has been stopped after the paper discharge. When printing is again started, the motor for rotating the rotational polygonal mirror is supplied with electric power so that its acceleration is started. The acceleration increases at 10000 rpm per second similarly to the acceleration arranged at the time of the starting from the stopping state. For example, when power is supplied to the motor which is still rotating at 3000 rpm due to an inertia, the acceleration starts from 3000 rpm and it reaches 13000 rpm after a lapse of time of one second. As described above, when the polygonal-mirror rotating motor is still rotating due to inertia, the servo locking occurs more quickly and before the completion of the pre-rotation. Therefore, it is preferable that the sequence of the image forming process be arranged to be started when both the servo lock signal for the polygonal-mirror rotating motor and the pre-rotation process completion signal are turned on to accommodate the case in which the rotation of the polygonal-mirror rotating motor is started after the photosensitive drum has started its rotation.

It is preferable that the region of the photosensitive drum, which has been subjected to the transfer charge, also be subjected to the primary charge.

Figure 5:
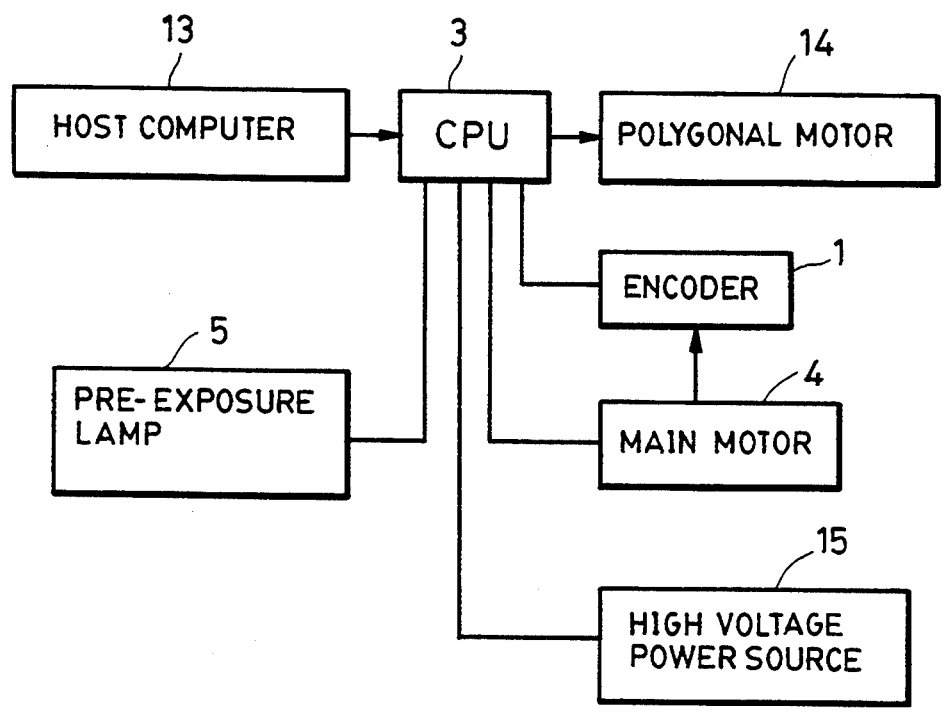
FIG. 5 is a block diagram which illustrates the control according to another embodiment of the present invention.

Next, another embodiment of the present invention will be described. The essential portion of the apparatus is the same as that of the above-described embodiment. Therefore, a detailed description about it is omitted here. FIG. 5 is a block diagram which illustrates a control circuit according to this embodiment. Referring to the drawing, reference numeral 3 represents a CPU for controlling the operation of the printer, the CPU 3 having a portion for receiving image data or dot density data supplied from a host computer 13. Reference numeral 4 represents a drum-rotating motor connected to the photosensitive drum via the encoder so as to transmit pulse signals whose number corresponds to the quantity of the rotation of the encoder to the CPU 3. The drum rotating motor 4 for operating the photosensitive drum, the fixing device and the paper conveying system, a high tension power source 15 for the transfer charger or the primary charger and the pre-exposure lamp 5 are connected to the CPU 3. The CPU 3 includes a non-volatile memory which stores encoder pulse data with which the rotational start of the polygonal-mirror rotating motor corresponding to each of the dot densities is determined.

As described above, the rotation of the polygonal-mirror rotating motor corresponding to the dot density stored in the memory of the CPU 3 is started. For example, the memory stores data for 300 DPI corresponding to the number of the encoder pulses which correspond to 0.89 second after the start of pre-rotation. Thus, each of the dot densities and the number of the encoder pulses are stored as a reference table for the CPU memory.

The operation will now be described. When a printing start signal is generated, the pre-rotation process is started so that the drum rotating motor 4 is supplied with electric power and it starts rotation. Simultaneously with this, pulse signals, in proportion to the quantity of the rotation, are transmitted from the encoder 1 so as to be transmitted to the CPU 3. The CPU 3 counts the pulse signals, and then the CPU 3 calls data, which corresponds to the dot density data from the host computer, from the reference table stored in the memory of the CPU 3 so as to subject it to a comparison with the pulse signal count from the encoder 1. The counting and the comparison are repeated until the count value becomes or exceeds the called data. When the above-described condition is met, the CPU 3 issues a command to rotate the polygonal-mirror rotating motor 14. The pre-rotation process is performed in accordance with the previously stored sequence from the start of the rotation of the drum rotating motor to the servo locking of the polygonal-mirror rotating motor. Thus, the pre-rotation process without useless rotation of the polygonal mirror can be performed.

Another embodiment will be described which is able to be used in the case where the polygonal-mirror rotating motors have different starting characteristic from one another. It has been confirmed that the revolution speed of a DC motor employed as the polygonal-mirror rotating motor increases at a constant acceleration from its start to servo locking. The reason for this lies in that the load to be applied to the polygonal-mirror rotating motor is designed not to be substantially changed. The above-described factor is one of the most critical factors for the polygonal-mirror rotating motor to overcome the non-uniform rotations which is considered to be the critical disadvantage for the-polygonal-mirror rotating motor. Therefore, the starting characteristics of the polygonal-mirror rotating motor can be significantly stabilized. Therefore, the constant starting characteristics can be obtained in the same machine.

The CPU 3 counts the time from the start of the polygonal-mirror rotating motor to its servo locking. As described above, the relationship between the maximum rotational speed and the time taken for the motor starting is not substantially changed and it can be measured and stored. For example, in the case of an optical beam printer the image recording density of which is arranged to be constant, the polygonal-mirror rotating motor is started whenever power is supplied thereto so as to measure and store it.

In the case where the image recording density can be switched to a plurality of densities, the first start time after the switching is measured so as to be stored in the corresponding data tables. Then, reference is made to the value stored in the data table so that sequence control is performed.

Figure 6:
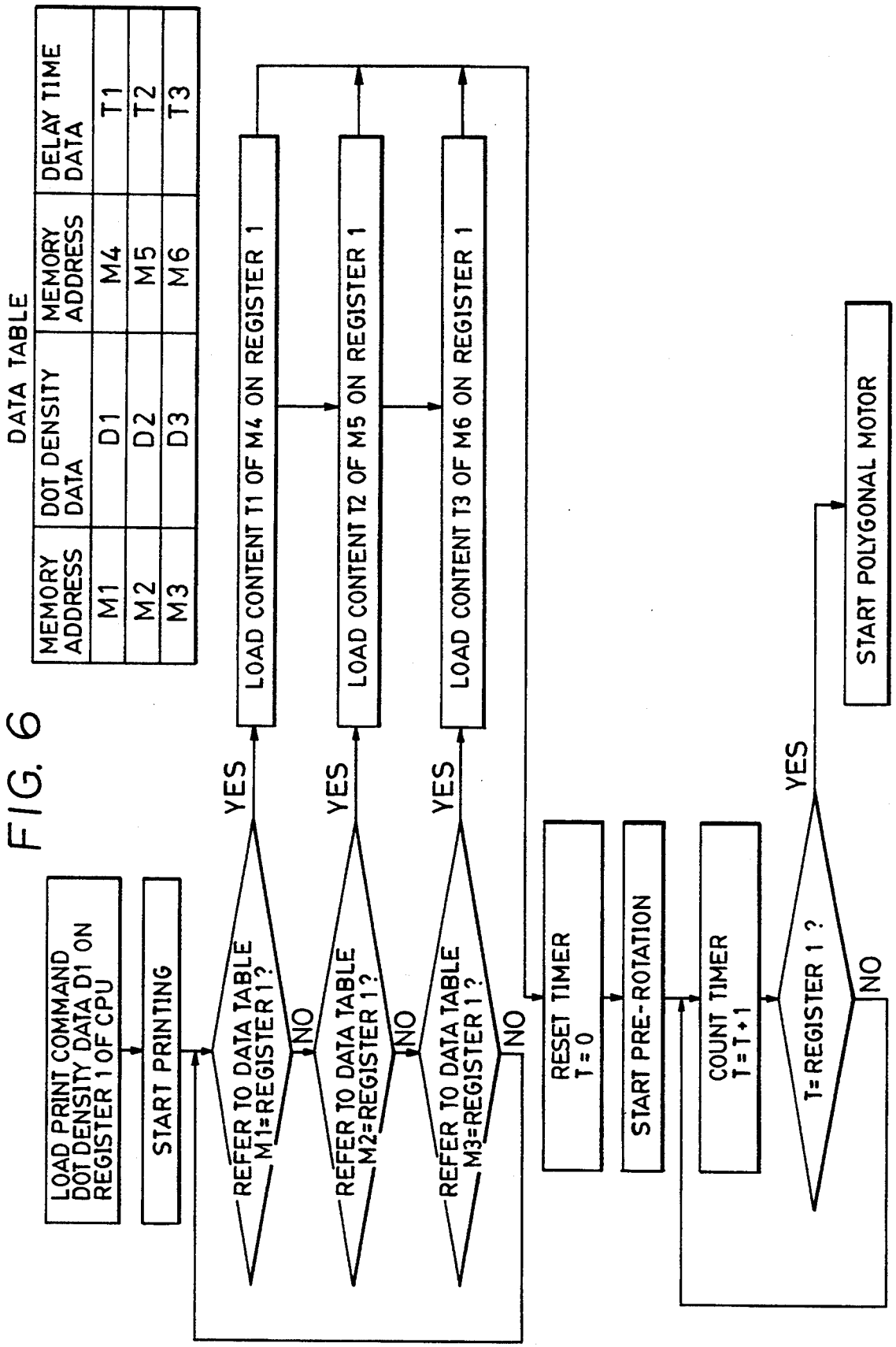
FIG. 6 is a flow chart which illustrates a still further embodiment of the present invention.

FIG. 6 is a flow chart for controlling the starting timing of the polygonal-mirror rotating motor in accordance with the above-described time, where the delay time corresponding to the dot density of the image signal is stored in the memory of the CPU 3 as a data table.

For example, there is stored delay time data with which the rotation of the polygonal-mirror rotating motor is started after a delay time of 1.11 seconds after the start of the pre-rotation in the case of 240 DPI. Similarly in the case of 300 DPI, delay time data of 0.89 seconds is stored, while delay time data of 0.52 seconds is stored in the case of 400 DPI. The above-described delay data is determined by subtracting the start time at the rotational speed which corresponds to the dot density of the polygonal-mirror rotating motor from the time necessary to complete the pre-rotation process. Substantially simultaneously with the transmission of the print starting signal from the host computer 13, data for the dot density is supplied to the CPU 3 so that the CPU 3 loads the delay time data, which corresponds to the dot density, from the data table stored in the memory thereof. The CPU 3 counts the time simultaneously with the issue of a command of starting pre-rotation process. The count made by the CPU 3 and the value loaded on the register is subjected to a comparison every count. When they coincide with each other, the CPU 3 issues a command to start the operation of the polygonal-mirror rotating motor.

As described above, according to this embodiment, the polygonal-mirror rotating motor is started and the starting time is actually measured so as to calculate the rotation starting timing of the polygonal-mirror rotating motor from the thus obtained result of the measurement. Therefore, even if the starting time is different for each polygonal-mirror rotating motor, the completion timing of the pre-rotation and the servo locking timing of the polygonal-mirror rotating motor can be allowed to coincide with each other. Therefore, the pre-processing can be efficiently performed.

Another structure may be employed which is arranged in such a manner that the rotational speed of the photosensitive drum is detected from the counted value of the pulse signals supplied from the encoder and the rotation of the polygonal-mirror rotating motor is started when the rotational speed of the photosensitive drum reaches a predetermined speed for forming the image.

Although the description is made about the structure in which the polygonal-mirror rotating motor is employed as an element for deflecting the optical beam, the present invention is not limited to this. The present invention can be applied to all of the structures in which an optical beam is deflected by utilizing a rotational motion. For example, the present invention can be applied to a structure such as a hologram which rotates in one direction and to a structure such as a Galvano mirror which performs a reciprocating motion.

Although the description is made about the structure in which the photosensitive material is realized in the form of the photosensitive drum, another rotatable photosensitive member in the form of a photosensitive belt or the like can be applied to the present invention.

Although the invention has been described in its preferred form with a certain degree of particularly, it is understood that the present disclosure of the preferred form can be modified by those skilled in the art without departing from the spirit and the scope of the invention as hereinafter claimed.

What is claimed is:

1. A laser beam printer comprising:
   laser beam emitting means for emitting a laser beam which has been modulated in accordance with image information;
   rotatable deflecting means for deflecting the laser beam emitted from said laser beam emitting means;
   a rotatable photosensitive member which is scanningly exposed to light by the laser beam deflected by said deflecting means; and
   control means for controlling the rotation of said photosensitive member and for controlling the rotation of said deflecting means to start after starting the rotation of said photosensitive member so that a predetermined pre-rotation period of said photosensitive member completes when said deflecting means reaches a predetermined rotational speed.

2. A laser beam printer according to claim 1, wherein the rotation of said deflecting means is started during pre-rotation of said photosensitive member.

3. A laser beam printer according to claim 2, wherein the pre-rotation of said photosensitive member is at least one revolution.

4. A laser beam printer according to claim 2, wherein a pre-operational processing in which said photosensitive member is exposed to light and subjected to charging for the purpose of stabilizing the sensitivity of said photosensitive member is performed during said pre-rotation.

5. A laser beam according to claim 1, wherein said control means controls the rotation of said deflecting means and that of said photosensitive member in response to an input of a print command.

6. A laser beam printer comprising:
   laser beam emitting means for emitting a laser beam which has been modulated in accordance with image information;

rotatable deflecting means for rotatably deflecting the laser beam emitted from said laser beam emitting means;

a rotatable photosensitive member which is scanningly exposed to light by the laser beam deflected by said deflecting means; and control means for controlling the rotation of said photosensitive member and for controlling the rotation of said deflecting means to start in accordance with a quantity of rotation of said photosensitive member so that a predetermined pre-rotation period of said photosensitive member completes when said deflecting means reaches a predetermined rotational speed.

7. A laser beam printer according to claim 6, further comprising detection means for detecting the quantity of rotation of said photosensitive member so that when the value detected by said detection means reaches a predetermined quantity of rotation, the rotation of said deflecting means is started.

8. A laser beam printer according to claim 7, wherein said detection means comprises an encoder for generating pulses in accordance with the quantity of rotation of said photosensitive member.

9. A laser beam printer according to claim 6, wherein said predetermined quantity of rotation of said photosensitive member is selected in accordance with a dot density at which said laser beam is modulated.

10. A laser beam printer according to claim 9, further comprising means for transmitting one of a plurality of dot density data items to said control means in accordance with the dot density at which the laser beam is modulated.

11. A laser beam printer according to claim 6, wherein the rotation of said deflecting means is started during pre-rotation of said photosensitive member.

12. A laser beam printer according to claim 11, wherein the pre-rotation of said photosensitive member is at least one revolution.

13. A laser beam printer according to claim 6, wherein said control means controls the rotation of said deflecting means and that of said photosensitive member in response to an input of a print command.

14. A laser beam printer comprising:

laser beam emitting means for emitting a laser beam which has been modulated in accordance with image information;

rotatable deflecting means for rotatably deflecting the laser beam emitted from said laser beam emitting means;

a rotatable photosensitive member which is scanningly exposed to light by the laser beam deflected by said deflecting means; and control means for controlling the rotation of said photosensitive member, and for controlling the rotation of said deflecting means to start after a predetermined lapse of time from the start of rotation of said photosensitive member so that a predetermined pre-rotation period of said photosensitive member completes when said deflecting means reaches a predetermined rotational speed.

15. A laser beam printer according to claim 14, further comprising detection means for detecting the quantity of rotation of said photosensitive member so that when the value detected by said detection means reaches a predetermined quantity of rotation, the rotation of said deflecting means is started.

16. A laser beam printer according to claim 15, wherein said predetermined quantity of rotation of said photosensitive member is selected in accordance with a dot density at which said laser beam is modulated.

17. A laser beam printer according to claim 16, further comprising means for transmitting one of a plurality of dot density data items to said control means in accordance with the density at which the laser beam is modulated.

18. A laser beam printer according to claim 14, wherein the rotation of said deflecting means is started during pre-rotation of said photosensitive member.

19. A laser beam printer according to claim 18, wherein the pre-rotation of said photosensitive member is at least one revolution.

20. A laser beam printer according to claim 18, wherein said predetermined time is determined by measuring the starting time of said deflection means and subtracting the thus obtained starting time from the time of said pre-rotation of said photosensitive member.

21. A laser beam printer according to claim 20, wherein said determined time is stored in a memory.

22. A laser beam printer according to claim 14, wherein said control means controls the rotation of said deflecting means and that of said photosensitive member in response to an input of a print command.

23. A laser beam printer comprising:

laser beam emitting means for emitting a laser beam which has been modulated in accordance with image information;

rotatable deflecting means for rotatably deflecting the laser beam emitted from said laser beam emitting means;

a rotatable photosensitive member which is scanningly exposed to light by the laser beam deflected by said deflecting means; and control means for controlling the rotation of said photosensitive member and for controlling the rotation of said deflecting means to start when said photosensitive member reaches predetermined speed so that a predetermined pre-rotation period of said photosensitive member completes when said deflecting means reaches a predetermined rotational speed.

24. A laser beam printer according to claim 23, further comprising detection means for detecting the rotational speed of said photosensitive member.

25. A laser beam printer according to claim 24, wherein said detection means counts pulses generated by an encoder in accordance with a movement of said photosensitive member so as to detect the rotational speed of said photosensitive member.

26. A laser beam printer according to claim 23, wherein said predetermined speed is a rotational speed of said photosensitive member at the time of forming an image.

27. A laser beam printer according to claim 23, wherein the rotation of said deflecting means is started during pre-rotation of said photosensitive member.

28. A laser beam printer according to claim 27, wherein the pre-rotation of said photosensitive member is at least one revolution.

29. A laser beam printer according to claim 23, wherein said control means controls the rotation of said deflecting means and that of said photosensitive member in response to an input of a print command.

* * * * *

UNITED STATES PATENT AND TRADEMARK OFFICE
CERTIFICATE OF CORRECTION

PATENT NO. : 5,448,267
DATED : September 5, 1995
INVENTOR(S) : Yoshinori SUGIURA, et al.

It is certified that error appears in the above-indentified patent and that said Letters Patent is hereby corrected as shown below:

Column 10, line 40, "predetermined" should read --a predetermined--.

Signed and Sealed this

Twenty-third Day of January, 1996

Attest:

BRUCE LEHMAN

*Attesting Officer*     *Commissioner of Patents and Trademarks*